United States Patent
Falk (10) Patent No.: US 10,612,541 B2
(45) Date of Patent: Apr. 7, 2020

(54) ARRANGEMENT COMPRISING A ROTOR, A STATOR AND MEANS FOR MUTUAL POSITION DETECTION THEREOF

(71) Applicant: Hudiksvalls Teknikcentrum AB, Hudiksvall (SE)

(72) Inventor: Curt Gunnar Falk, Hudiksvall (SE)

(73) Assignee: Hudiksvalls Teknikcentrum AB, Hudiksvall (SE)

( * ) Notice: Subject to any disclaimer, the term of this patent is extended or adjusted under 35 U.S.C. 154(b) by 228 days.

(21) Appl. No.: 15/536,257

(22) PCT Filed: Dec. 11, 2015

(86) PCT No.: PCT/SE2015/051329
§ 371 (c)(1),
(2) Date: Jun. 15, 2017

(87) PCT Pub. No.: WO2016/099383
PCT Pub. Date: Jun. 23, 2016

(65) Prior Publication Data
US 2017/0342979 A1   Nov. 30, 2017

(30) Foreign Application Priority Data
Dec. 15, 2014   (SE) ...................................... 1400593

(51) Int. Cl.
*F04C 2/063* (2006.01)
*F04C 15/00* (2006.01)
(Continued)

(52) U.S. Cl.
CPC .......... *F04C 2/063* (2013.01); *F04C 15/0042* (2013.01); *F15B 15/12* (2013.01);
(Continued)

(58) Field of Classification Search
CPC ..... F01L 1/3442; F04C 2/063; F04C 15/0042; F16D 3/10; B62D 5/097
(Continued)

(56) References Cited

U.S. PATENT DOCUMENTS 2,569,640 A * 10/1951 Mercier .................... F03C 4/00
    235/61 PL
3,053,236 A *  9/1962 Self ......................... B64C 13/24
    277/345
(Continued)

FOREIGN PATENT DOCUMENTS

NO     301351 B1    10/1997
WO   2013172761 A1  11/2013

OTHER PUBLICATIONS

International Search Report from corresponding International Application No. PCT/SE2015/051329, dated May 10, 2016.

*Primary Examiner* — Deming Wan
(74) *Attorney, Agent, or Firm* — Tucker Ellis LLP (57) ABSTRACT

The bearing assembly, consisting of a stator component (S1) and a rotor component (R1), where the rotor component is adapted for a back-and-forth oscillatory movement (P, -P) relative to the stator component, whereby a number of cavities (301 and 302; 303 and 304) coordinated along the outer periphery of the rotor component and the inner periphery of the stator component, formed with an increasing volume (301 and 302) and a decreasing volume (303 and 304), respectively, during rotation of the rotor component in an initial direction (P) from an initial position (IP) and towards a final position (FP), while the cavities allow the volumes to decrease and increase during a rotational motion of the rotor component in a second direction (-P) in relation to the stator component (S1). The invention specifies that the above-mentioned bearing arrangement is to be adapted to interact with an instrument (M1) in order to determine, with
(Continued)

the help of at least two components, the momentary position of the rotor component in relation to the stator component.

15 Claims, 3 Drawing Sheets

(51) Int. Cl.
| | |
|---|---|
| *F15B 15/12* | (2006.01) |
| *F01L 1/344* | (2006.01) |
| *B62D 5/097* | (2006.01) |
| *F15B 15/28* | (2006.01) |
| *F16C 33/66* | (2006.01) |
| *F16C 13/02* | (2006.01) |
| *F16C 32/06* | (2006.01) |

(52) U.S. Cl.
CPC ...... *F04C 2240/50* (2013.01); *F04C 2240/81* (2013.01); *F04C 2270/80* (2013.01); *F15B 15/2815* (2013.01); *F16C 13/024* (2013.01); *F16C 32/064* (2013.01); *F16C 33/6637* (2013.01)

(58) Field of Classification Search
USPC .................................................. 418/35, 61.3
See application file for complete search history.

(56) References Cited

U.S. PATENT DOCUMENTS

| | | |
|---|---|---|
| 5,367,992 A | 11/1994 | Butterfield et al. |
| 5,809,955 A | 9/1998 | Murata |
| 2013/0118430 A1* | 5/2013 | Moriya ................ F01L 1/3442 123/90.15 |
| 2014/0174287 A1 | 6/2014 | Smith |
| 2014/0271296 A1 | 9/2014 | Kim et al. |

* cited by examiner

ARRANGEMENT COMPRISING A ROTOR, A STATOR AND MEANS FOR MUTUAL POSITION DETECTION THEREOF

TECHNICAL AREA OF THE INVENTION

The present invention relates in general to a bearing arrangement and, more specifically, to a bearing arrangement that can easily enclose a rotating shaft, freely rotatable within the bearing arrangement, with the ability to allow a back-and-forth oscillatory motion of a rotor component contained in the aforementioned bearing arrangement.

A bearing arrangement associated with the invention includes the aforementioned rotor component or rotor unit and a stator component or stator unit, where the latter must surround or enclose the rotor component.

Such a bearing arrangement, consisting of a stator and a rotor component, where the rotor component is adapted for a back-and-forth oscillatory motion relative to the stator component, will be coordinated along the outer periphery of the rotor component and the inner periphery of the stator component with a number of cavities (minimum two) that are formed with an increasing volume, at least in terms of a volume, and a decreasing volume, at least in terms of a volume, during rotation of the rotor component in an initial direction from a starting position and toward a terminal position, during which time the cavities allow the volumes to decrease and increase during a rotational motion of the rotor component in a second direction in relation to the stator component.

The bearing arrangement as described in the present invention is intended to among other things have a unique application for use in crop harvesting, shown and described in the International Patent Publication WO 2013/172761 A1 (PCT/SE2013/000081).

The present invention is likewise intended for a variety of other potential applications, such as windshield wipers for vehicles.

BACKGROUND OF THE INVENTION

Methods, arrangements, and designs related to the technical area indicated above and with a function and nature which meet the given requirements exist already in a number of different types of implementation.

For a deeper understanding of the present invention and clarification of its background refer to the contents of the aforementioned international patent publication.

Besides this application, there are various ways to assign a shaft a back-and-forth motion.

This category includes the utilization of a motor, either powered electrically or by another means, whose rotating shaft will generate this back-and-forth motion through an arrangement of gears.

COMMENTARY ON THE PRESENT INVENTION

Technical Challenges

Considering under the circumstances the technical considerations which an expert in the related technical field needs to make to be able to offer a solution to one or more of the technical problems posed, insight into the measures and/or the sequence of measures that must be taken is initially called for, followed consequentially by a choice of the resource or resources required, so that the subsequent technical problems can be considered relevant in the creation of the present subject matter of the invention.

In light of the previous state of this technology, as described above, it can be viewed as a technical problem to recognize the importance of the advantages associated with and/or the technical considerations which will be required, in the application of an maneuverable bearing arrangement, comprised of a stator component and a rotor component, where the rotor component is adapted for a circular back-and-forth oscillatory motion relative to the stator component, with a number of cavities coordinated along the outer periphery of the rotor component and the inner peripheries of the stator component, formed with an increasing volume and a decreasing volume, respectively, during rotation of the rotor component in an initial direction from a starting position and towards a terminal position, while the cavities allow the volumes to decrease and increase, respectively, during a rotational motion of the rotor component in a second direction in relation to the stator component and where the rotation of the rotor component relative to the stator component of a hydraulic or similar flow and pressure.

In the case of a bearing arrangement of an initially specified nature, there is a technical problem in recognizing the importance of the advantages associated with, and/or the technical considerations required for, allowing the bearing arrangement to be adapted to interact with an instrument that is designed in such a way that it can establish the internal and momentary position of the rotor component relative to the stator component.

There is a technical challenge in being able to recognize the importance of the advantages associated with, and/or the technical considerations required for, allowing the aforementioned instrument to contain a related component between the stator and the rotor components of the bearing arrangement.

There is a technical challenge in being able to recognize the importance of the advantages associated with, and/or the technical considerations required for, allowing the aforementioned instrument to contain a first component coordinated with the stator component of the bearing arrangement.

There is a technical challenge in being able to recognize the importance of the advantages associated with, and/or the technical considerations required for, allowing the guide rail or guide curve associated with the rotor component of the bearing arrangement, as a second part, be cylindrically-shaped with an axially-oriented extension for the creation of a helical shape.

There is a technical challenge in being able to recognize the importance of the advantages associated with, and/or the technical considerations required for, allowing the guide curve be oriented towards the rotor component at an angle between 30 and 60 degrees, such as around 45 degrees, relative to a center line associated with the bearing arrangement.

There is a technical challenge in being able to recognize the importance of the advantages associated with, and/or technical considerations required for, letting a back-and-forth-movable guide pin formed by the instrument be arranged as a second part of the stator component and allowed to abut and follow the guide rail with its guide curve during the rotor component's motion relative to the stator component.

There is a technical challenge in being able to recognize the importance of the advantages associated with, and/or the technical considerations required for, allowing the guide pin position relative to the guide disc, along with the guide disc and the stator component, to be adapted to correspond to the rotational position of the rotor component relative to the stator component.

There is a technical challenge in being able to recognize the importance of the advantages associated with, and/or the technical considerations required for, allowing a portion of an oil pressure-generated oil flow be brought, through a channel assigned to the stator component, to a cavity with increasing volume, while simultaneously oil compounds within a cavity with decreasing volume presses through a shaped hole or holes in the stator component to a valve arrangement.

There is a technical challenge in being able to recognize the importance of the advantages associated with, and/or the technical considerations required for, allowing a valve arrangement, such as a two-way valve arrangement, in the initial position, to be connected to the aforementioned holes or channels assigned to the stator component and to supply and evacuate oil compounds in the cavities via an initial rotational movement and vice versa.

There is a technical challenge in being able to recognize the importance of the advantages associated with, and/or the technical considerations required for, a number of cavities, referred to as "primary", being adapted to be able to be supplied with oil and oil compounds under pressure, while allowing a number of cavities, referred to as "secondary", to evacuate the oil or oil compounds contained therein, and where the aforementioned evacuating oil compounds are, via one or more conduits and/or channels, connected to the aforementioned valve arrangement.

There is a technical challenge in being able to recognize the importance of the advantages associated with, and/or the technical considerations required for, allowing several primary cavities and several secondary cavities be distributed peripherally about the axis within the stator and/or rotor component via shaped wings in the stator and/or rotor component.

There is a technical challenge in being able to recognize the importance of the advantages associated with, and/or the technical considerations required for, allowing several primary cavities to be coordinated, via internal conduits within the rotor component, with a serial and/or parallel oil feed to and from the valve arrangement.

There is a technical challenge in being able to recognize the importance of the advantages associated with, and/or the technical considerations required for, allowing several secondary cavities to be coordinated, via internal conduits within the rotor component, in order to direct evacuated oil compounds to and from the assigned valve arrangement in a serial and/or parallel fashion.

There is a technical challenge in being able to recognize the importance of the advantages associated with, and/or the technical considerations required for, allowing the aforementioned stator component be built of several disc units or discs, where at least two can be integrated or coordinated for a readily detachable interaction with another disc unit or disc.

There is a technical challenge in being able to recognize the importance of the advantages associated with, and/or the technical considerations required for, allowing the aforementioned additional disc unit comprising the stator component to be fixed but easily detachable, for example with screws attached to it or the other disc units comprising the stator component.

The Solution

The present invention builds on the familiar technology behind a bearing arrangement, represented by a stator and a rotor component, where the rotor component is adapted for a back-and-forth oscillatory motion relative to the stator component, wherein a number of cavities are coordinated along the outer periphery of the rotor component and the inner periphery of the stator component, formed with an increasing volume, at least in terms of a volume, and a decreasing volume, at least in terms of a volume, during a rotation of the rotor component in an initial direction from a starting position and toward a terminal position, while the cavities allow the volumes to decrease and increase by a rotary motion of the rotor component in a second direction relative to the stator component.

As specified in the guidelines for this invention, the bearing arrangement is to be adapted to interact with a particular instrument in order to set the momentary position of the rotor component embedded within the stator component in relation to the stator component.

As proposed designs, falling within the scope of the invention, attention is specifically directed toward the fact that the aforementioned instruments should include components related to the stator and rotor components of the bearing arrangement.

Additionally, the aforementioned instrument may include a first component coordinated with the stator component of the bearing arrangement and a second component coordinated with the rotor component, associated with a guide rail with a guide curve, which in principle can be cylindrically-shaped but with a fairly small axially-oriented extension.

The present invention specifies in particular that such a guide rail or guide curve should be oriented at an angle between 0 and 60 degrees, such as around 45 degrees, relative to a center line associated with a bearing arrangement.

It is furthermore proposed that a guide pin, arranged to move back-and-forth, which shall be arranged to abut and follow the guide rail or guide curve during the motion of the rotor component, where the position of the guide pin is detectable and via a mechanical and/or electrical conversion via electric or electronic circuits, may be used to set the position of the rotor componentrelative to the stator component.

The guide pin positioning relative to the guide disc and the stator component thus becomes adapted through the guide rail or guide curve to directly correspond to the rotating position of the rotor component relative to the stator component.

It is also proposed that a portion of an oil pressure-generated oil flow be directed, through a channel assigned to the stator component, toward a cavity with an increasing volume, while oil compounds within a cavity with a decreasing volume press the oil compounds through shaped hole or holes in the stator component and adjacent to this cavity under compression, where oil will be supplied via a pump and a valve arrangement while the evacuation takes place via the valve arrangement to a tank.

In order to offer a rapid back-and-forth-oriented motion, to be able to control the amplitude between an initial position and a terminal position, and to supply and evacuate the oil compounds in the cavity via an initial rotary movement and vice versa, a valve arrangement is proposed, such as a two-way valve arrangement, connected to the aforementioned holes assigned to the stator component.

Specifically, the present invention proposes that while a number of cavities, referred to as "primary", are adapted to be supplied with oil and oil compounds under pressure, a number of cavities, referred to as "secondary", are allowed to evacuate oil or oil compounds contained therein and the aforementioned evacuating oil compounds are adapted to pass, through one or more conduits and/or channels, through to a double-acting valve arrangement.

It is further suggested that several primary cavities and several secondary cavities be distributed peripherally about the axis in the stator and/or rotor component(s).

Finally, the present invention specifies that several primary cavities be coordinated through the internal conduits of the rotor component's for a serial oil supply via the valve arrangement and several secondary cavities be coordinated through the internal conduits of the rotor componentto serially direct evacuated oil components through the associated valve arrangement to a tank.

Finally, the aforementioned stator component may be composed of several disc units or discs, where at least two are integrated or coordinated for interaction with an additional disc unit or disc.

The aforementioned additional disc unit comprising the stator component should be fixed but easily removable, such as with screws, attached to the other disc units comprising the stator component.

Advantages

The advantages which may principally be deemed to be characteristic of the present invention and its thereby demonstrated significant characteristics are that preconditions have been created for utilizing, by means of a bearing arrangement consisting of a component assigned to a stator and a component assigned to a rotor, this bearing arrangement to measure and determine a relative motion between the positions of the components, thereby allowing control of the speed of the mutual oscillatory motion and assigned amplitude of the components through a valve arrangement.

For this purpose the present invention provides a measuring arrangement with two components, a first component assigned to a stator and a second component assigned to a rotor, with a guide rail and/or guide curve activated by a rotary and rotational effect assigned to the rotor component. The pressure from the oil that has a rotational effect on the rotor provides strong hydrostatic lubrication of all non-sealed bearing surfaces which can absorb high radial, axial, and bending forces.

That which may principally be regarded as characterizing a bearing arrangement, in accordance with the present invention, is specified in the characterizing part of the following claim 1.

BRIEF FIGURE DESCRIPTIONS

The proposed designs, displaying the significant characteristics associated with the present invention, shall now for the purpose of providing an example be described in greater detail with reference to the attached drawings, in which:

FIG. 12 shows and describes in a plan view the section D-D in FIG. 11 and FIG. 13 schematically shows a hydraulic circuit diagram of a proposed valve arrangement, by which, and with the valve arrangement in an initial position, one or more expanding cavities can be connected to an oil pump and one or more evacuating cavities can be connected to a tank and simultaneously be influenced to rotate the rotor component relative to the stator component in an initial direction, and where the valve arrangement can assume a second position (not shown) for the opposite function and rotational direction.

DESCRIPTION OF THE CURRENTLY PROPOSED DESIGNS

It should initially be emphasized that in the following description of the currently proposed designs, specific terms and expressions have been used for the purpose of clarification, while the interpretation of the principles of the invention may also include other terms and expressions.

The present invention will now be described in more detail by referencing the attached drawings in which three different design examples illustrate the characteristics of the invention.

Although the present invention is illustrated as a bearing arrangement, it should be taken into account that the invention can also be applied to a motor and/or pump with a rotor component assigned a motion in a back-and-forth direction.

Figure 1:
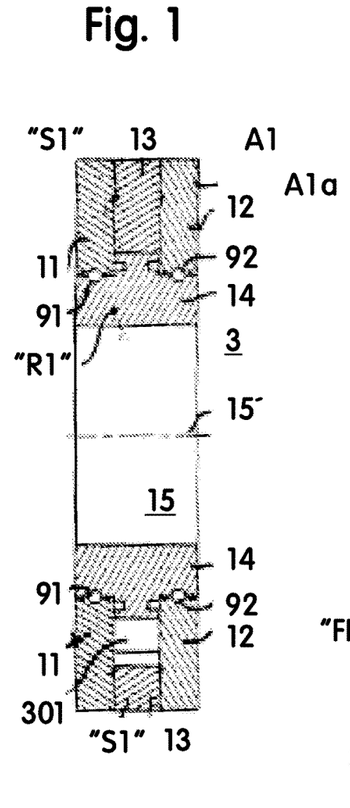
FIG. 1 (corresponding to FIG. 9 in the aforementioned patent publication) allows a side view illustration of the bearing arrangement, consisting of three coordinated disc units in the shape of a reference circle as a stator component and a disc unit in the shape of a reference circle as a rotor component, where the stator and the rotor components with their centered holes are adapted to surround a rotating shaft, and where the stator and the rotor components comprise expanding and compressing cavities within the bearings, formed through interaction between the wings of the stator component and the oscillating rotor component.

Thus, FIG. 1 illustrates a bearing arrangement, A1, including the first design, presenting a stator component, S1, and a rotor component, R1, where the rotor component is adapted for a back-and-forth directional oscillatory motion, P, alternatively, −P, relative to the stator component.

Figure 2:
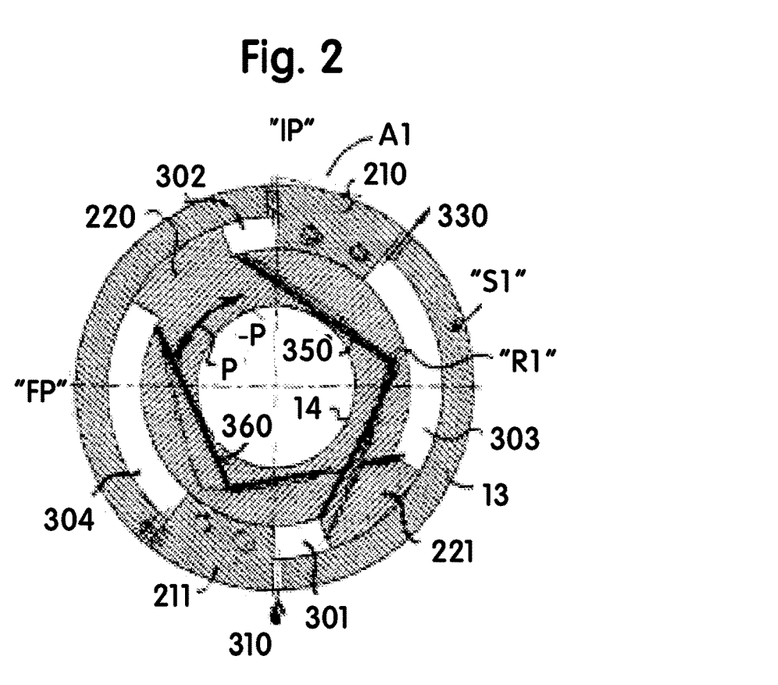
FIG. 2 illustrates the bearing arrangement as per FIG. 1 in a plan view with the internal channels of the rotor component for bonding the expanding cavities and the internal channels of the rotor component for bonding the compressing cavities.
Figure 3:
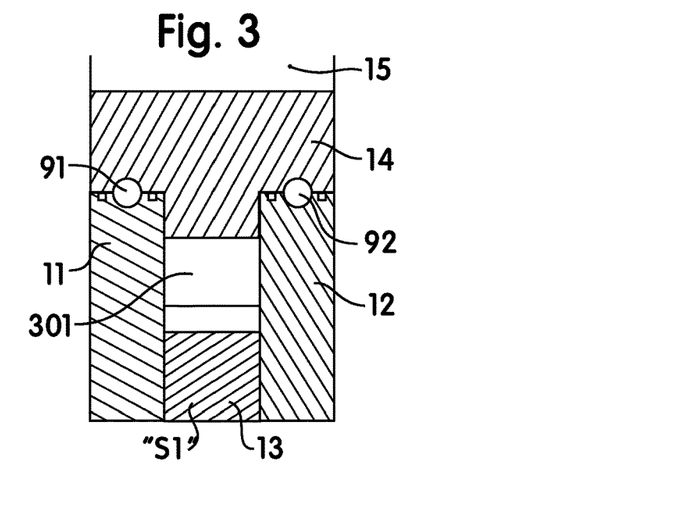
FIG. 3 shows and describes a lower peripheral section as per FIG. 1 and provides an illustration of a stator component made up of three disc units and a rotor component made up of a single disc unit as an initial design.

Along the outer periphery of the rotor component, R1, and the inner periphery of the stator component, S1, there are, as per FIG. 2, a number of coordinated cavities, formed with an increasing volume 301, 302, at least in terms of volume, and a decreasing volume 303, 304, at least in terms of volume, during rotation of the rotor component in an initial direction, P, from an initial position, IP, and toward a terminal position, FP, while the cavities allow the volumes to decrease and increase during a rotary motion of the rotor component in a second direction, −P, in relation to the stator component, S1.

Figure 4:
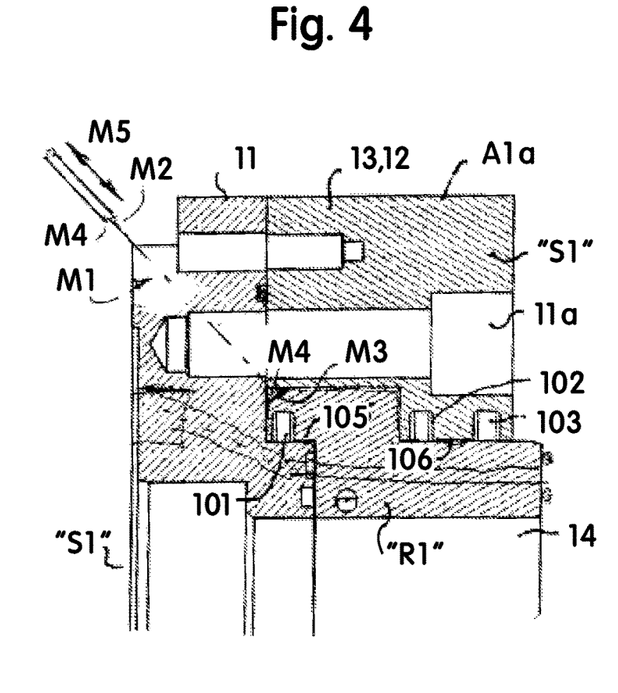
FIG. 4 shows and describes an upper part of the bearing arrangement in a second design where the stator component is composed of two disc units and the rotor component is composed of a disc unit. This figure also illustrates the existence of a means of determining the position of the rotor componentrelative to the stator component.

The bearing arrangement, A1, is adapted to interact with an instrument, M1, in FIG. 4, for determining the position of the rotor component, R1, relative to the stator component, S1.

The referred instrument, M1, contains parts related to the stator and rotor components of the bearing arrangement.

The instrument referred to, M1, contains a first part, M2, coordinated with the bearing arrangement's stator component, S1, while a second part, a guide rail or guide curve, M3, assigned to a rotor component, R1, is cylindrically-shaped with an axially-oriented small extension by which the guide curve takes on a mild helical form with a pitch of less than one revolution, such as 90 degrees.

The guide curve, M3, may be oriented at an angle between 0 and 60 degrees in relation to a 15' center line associated with the bearing arrangement.

An axially-directed guide pin, M4, with a back-and-forth motion is adapted to attach to and follow the guide rail and guide curve during the reciprocal motion of the rotor component.

The location of the guide pin, M4, relative to the guide rail and the guide curve, M3, and the stator component, S1, is adapted to directly correspond to the rotational position of the rotor component relative to the stator component. It is proposed that the location of the guide pin, M4, be evaluated mechanically, electrically, or electronically in a circuit, M5, adapted to provide a value corresponding to the location of the guide pin, M4.

Herewith, not only does the valve arrangement, V10, control the back-and-forth oscillatory motion of the rotor component, but also the speed of the motion between the end positions or its amplitude via the supplied volume of oil compounds.

A portion of an oil flow generated by oil pressure in an oil pump, P10, is transferred, through a stator-assigned channel, 310, to a cavity, 301, with an increasing volume, while oil compounds in a cavity, 303, with a decreasing volume press oil compounds through a shaped hole or holes, 330, in the stator component, S1, and adjacent to the cavity under compression, 303.

FIG. 2 illustrates the existence of two serially connected cavities, 301 and 302, active during compression, connected via a channel, 350, assigned to a rotor component, while two serially connected cavities, 303 and 304, active during evacuation, are connected via a channel, 360, assigned to a rotor component.

The scope of the invention also includes the occurrence of one or more primary cavities, 301, along with one or more secondary cavities, 303, connected in a serial and/or parallel configuration.

The cavities, 301 and 302, are connected to the oil pump, P10, via a conduit, 310, while the cavities, 303 and 304, are connected to a tank, T10, via a conduit, 330. See FIG. 13.

A valve arrangement, V10, such as a two-way valve arrangement, is connected to the aforementioned holes, 310 and 330, assigned to stator components in order to supply and evacuate equal amounts of oil compounds associated with the cavity via an initial rotational movement and vice versa.

It is specifically disclosed that, while a number of cavities, 301 and 302, referred to as primary, are adapted to be supplied with, 310, oil and oil compounds under a specified pressure from a pump, P10, a number of cavities, 303 and 304, referred to as secondary, are allowed to evacuate the oil or oil compounds contained therein, and the aforementioned evacuating oil compounds are connected to the aforementioned tank, T10, via one or more conduits and/or channels, 330.

It is additionally proposed that several primary cavities and several secondary cavities are distributed peripherally about the axis in the stator component, S1, and/or the rotor component, R1.

FIG. 2 shows more specifically that the rotor component, R1, and disc, 14, are supplied with diametrically-oriented wings, 220 and 221, which are movable within the stator component, 51, between the wings, 210 and 211, that are related to the stator component. The peripheral length of the wings, 220 and 221, can of course be modified in order to cover a larger or smaller arc angle.

Several primary cavities, 301 and 302, are coordinated, through the internal conduits, 350, associated with the rotor component, shown in FIG. 2, for a more compact serial oil supply.

Several secondary cavities, 303 and 304, are coordinated, through the internal conduits, 360, associated with the rotor component, shown in FIG. 2, to serially direct the evacuating oil compounds through the outlet, 330, to an associated valve arrangement, V10.

Figure 5:
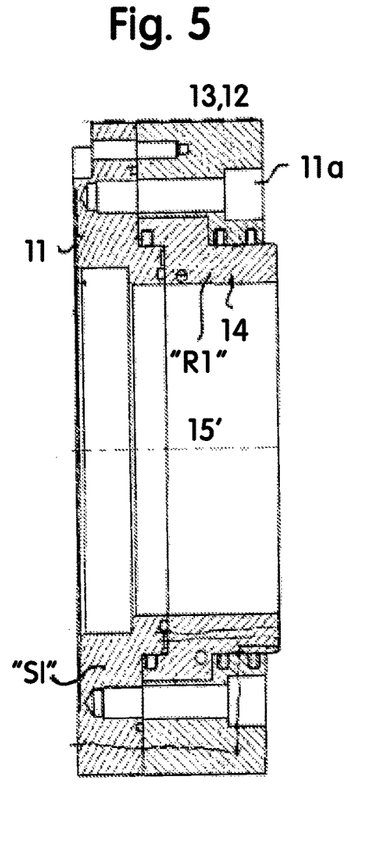
FIG. 5 shows the design in a side view as per FIG. 4 in a side view.

FIGS. 1 and 4 show that the aforementioned stator component, S1, is composed of several disc units or discs, 11, 12, and 13, wherein at least two, 12 and 13, are integrated or coordinated, as per FIGS. 4 and 5, for interaction with an additional disc unit or disc, 11.

The aforementioned additional disc unit, 11, comprising the stator component is fixed but easily removable, for instance with the help of screws, 11a, attached to the other disc units, 12 and 13, comprising the stator component in order to enclose the rotor component, R1.

The present invention provides additional designs in FIGS. 4 to 13 which fall within the scope of the invention.

Thus, FIG. 4 shows and describes the upper part, A1a, of a bearing arrangement, A1, in a second design where the stator component, S1, is composed of two disc units, 12 and 13, and the rotor component, R1, is composed of a disc unit, 11. The figure also illustrates the presence of an instrument, M1, for determining the position of the rotor component relative to the stator component, S1, or the disc unit, 14.

It is also illustrated here that the instrument, M1, is set at an angle against the 15' center line of the bearing arrangement which connects at or around a 45 degree angle and rests against a guide curve which is likewise oriented at 45 degrees from the 15' center line.

FIG. 4 also illustrates the presence of three O-rings, 101, 102 and 103, which are assigned to bearing surfaces between the stator component, S1, and the rotor component, R1, and where the bearing surfaces, 105 and 106, are oriented in the same, or substantially the same, radial distance from the center line 15'.

The bearing surface, 105, has a shorter axial extension than the bearing surface, 106, which has been provided with two seals in the form of O-rings 102 and 103.

The guide disc, M3, with the guide curve is positioned adjacent to the O-ring, 101.

FIG. 5 shows the design in a side view and a section, as per FIG. 4, which employ the same reference numbers for the same details.

Figure 6:
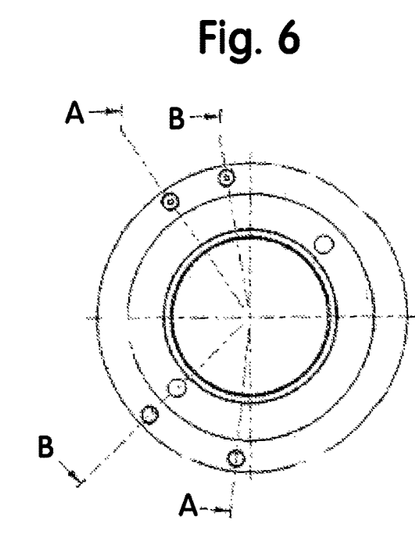
FIG. 6 shows and describes in a plan view the design from FIGS. 4 and 5
Figure 7:
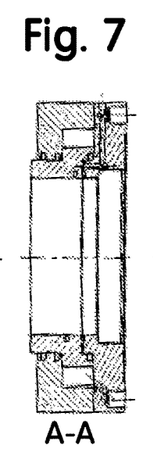
FIG. 7 shows and describes a cross-section A-A in FIG. 6.
Figure 8:
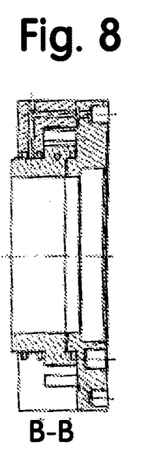
FIG. 8 shows and describes a cross-section B-B in FIG. 6.

FIG. 6 shows and illustrates in a plan view the design in FIGS. 4 and 5, whereas FIG. 7 shows and describes a cross-section A-A in FIG. 6, while FIG. 8 shows and describes a cross-section B-B in FIG. 6.

Figure 9:
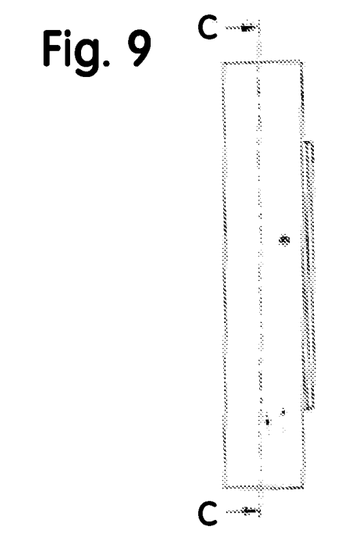
FIG. 9 shows the orientation of a cross-section C-C of a third design, where the assigned channels of the rotor component are oriented in different planes.
Figure 10:
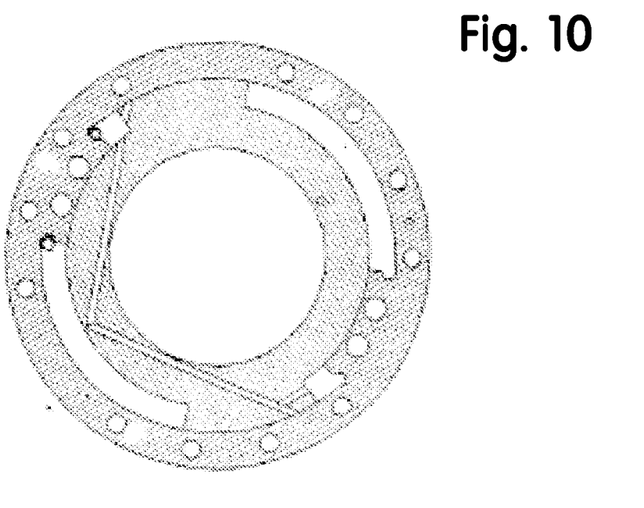
FIG. 10 shows and describes in a plan view the section C-C in FIG. 9 with a duct assigned to the rotor component on a first individual plane.
Figure 11:
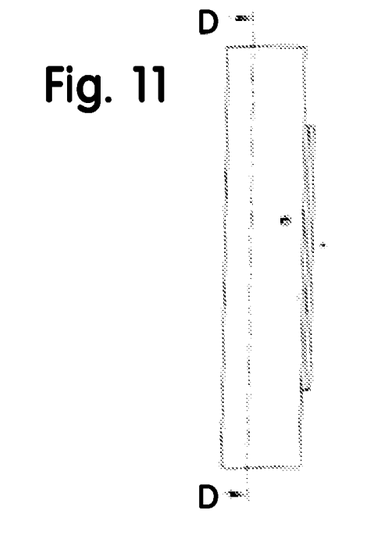
FIG. 11 shows a cross-section B-B of the aforementioned third design and the parallel cross-section CC with a duct assigned to the rotor component on a second individual plane.

FIG. 9 shows a cross-section C-C of a third design where the channels assigned to the rotor component are oriented in different planes and where FIG. 10 shows and describes in a plan view the section C-C in FIG. 9 with a duct assigned to the rotor component in a first plane, while FIG. 11 shows a cross-section D-D of the aforementioned third design and the related cross-section C-C with a duct assigned to the rotor component in a second plane.

Figure 12:
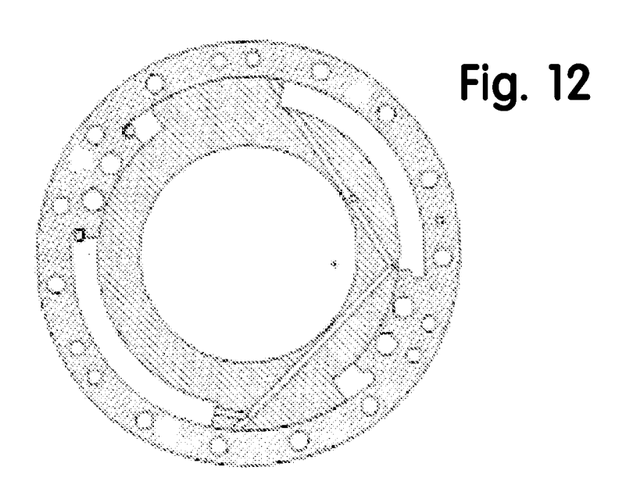

FIG. 12 shows and describes in a plan view the section D-D in FIG. 11 with inlaid ducting.

Figure 13:
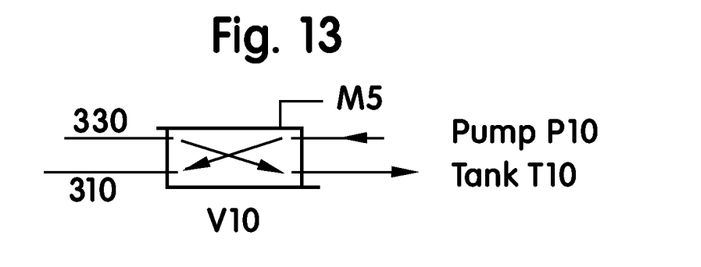

FIG. 13 schematically shows a hydraulic circuit diagram of a valve arrangement, V10, through which, and with the valve arrangement in the illustrated initial position, one or more expanding cavities, 301 and 301, can be connected through the inlet, 310, to an oil pump, P10, and one or more evacuating cavities, 303 and 304, can be connected through the outlet, 330, to a tank, T10, and simultaneously prompted to rotate the rotor component, R1, relative to the stator component, S1, in an initial direction, P, whereby the valve arrangement can assume a second position (not shown) for an opposite direction of rotation, illustrated in FIG. 2 as –P.

In the above description the expanding and compressing cavities are designated in order to illustrate the motion of the rotor component in relation to the stator component, and it is apparent that during the reverse movement of the rotor component, a previously expanding cavity will serve as a compressing cavity and vice versa.

It should be noted that the stator component, S1, is provided with internal wings, 210 and 211, which in the designs, as a result of the number of cavities, are diametrically oriented, while the rotor component, R1, is provided with corresponding external wings, 220 and 221, where these pairs of wings are intended to define the cavities.

During the illustrated rotational motion of the rotor component, R1, designated "P", cavities, 301 and 302, are expanding, while cavities, 303 and 304, are compressing an oil supply via a connection, 310, while the cavities, 303 and 304, are compressing to evacuate oil and oil compounds through the outlet, 330, communicating with the cavity, 303.

The cavities, 301 and 302, are serially connected via a first rotor-associated internal wiring harness, 350, while the cavities, 303 and 304, are serially connected via a second rotor-associated wiring harness, 360, whereby the bearing arrangement only requires one inlet, 310, and one outlet, 330, to rotate the rotor component in relation to the stator component between an initial position, IP, and a final position, FP.

The invention more specifically indicates that while a number of cavities, 301 and 302, referred to as primary, are adapted to be supplied with oil and oil compounds under pressure, a number of cavities, 303 and 304, referred to as secondary, are allowed to evacuate the enclosed amount of oil, and wherein the aforementioned evacuating amount of oil in the form of oil compounds can be fed to the valve arrangement via one or more conduits, 330.

Thus, it can be stated that by increasing the radian of the wings, 220 and 221, the amplitude of the oscillatory motion can be decreased, and/or by increasing the radian of the wings, 210 and 211, the amplitude of the oscillatory motion can be decreased.

The invention is not limited to the above-described designs, but may be modified within the scope of the present invention as it is defined in the first characterizing part of the following patent claim and/or in the sub-claims.

The invention claimed is:

1. A bearing arrangement, comprising a stator component and a rotor component, where the rotor component is adapted for a back-and-forth oscillatory motion relative to the stator component, and along an outer periphery of the rotor component and an inner periphery of the stator component there are a number of coordinated cavities formed with increasing volume and decreasing volume, respectively, during rotation of the rotor component in a first direction from an initial position and towards a terminal position, the cavities allow the volumes to decrease and increase during a rotational motion of the rotor component in a second direction in relation to the stator component, wherein the rotor component comprises a guide rail or guide curve, the guide rail or guide curve is cylindrically-shaped with an axially varying extension, and wherein the stator component houses an axially moveable guide pin that abuts and follows the guide rail or guide curve during rotary motion of the rotor component, an instantaneous position of the rotor component in relation to the stator component determinable from a location of the axially movable guide pin.

2. A bearing arrangement according to claim 1, wherein the guide rail or guide curve is oriented at an angle between 0 and 60 degrees, relative to a rotary axis of the rotor component.

3. An arrangement according to claim 2, wherein the angle is around 45 degrees.

4. A bearing arrangement according to claim 1, wherein the guide pin's location in relation to the axially moveable guide rail or guide curve and the stator component is adapted to corresponds to the rotary rotating position of the rotor component in relation to of the stator component.

5. A bearing arrangement according to claim 1, wherein a portion of an oil flow generated by oil pressure is transferred through a first channel in the stator component to a cavity with increasing volume, while oil compounds within a cavity with a decreasing volume are evacuated through a second channel in the stator component.

6. A bearing arrangement according to claim 1, wherein a valve arrangement is connected to the first and second channels of the stator component and allowed to supply and evacuate the oil compounds found in the cavity at an initial rotational movement and vice versa.

7. A bearing arrangement according to claim 6, wherein a number of cavities, referred to as primary, are adapted to be supplied with oil and oil compounds under pressure, and a number of cavities, referred to as secondary, are allowed to evacuate the oil or oil compounds contained therein, and the aforementioned evacuating oil portions are set to be supplied to the aforementioned valve arrangement via one or more conduits and/or channels.

8. An arrangement according to claim 7, wherein several of the primary cavities and several of the secondary cavities are distributed peripherally about the axis in the stator component and/or the rotor component.

9. An arrangement according to claim 8, wherein several of the primary cavities are coordinated via internal conduits for a serial and/or parallel oil supply.

10. An arrangement according to claim 8, wherein several of the secondary cavities are coordinated via internal conduits to direct evacuating oil compounds through the associated valve arrangement in a serial and/or parallel configuration.

11. An arrangement according to claim 8, wherein the aforementioned stator component is composed of several disc units or discs, where at least two are integrated or coordinated for interaction with an additional disc unit or disc.

12. An arrangement according to claim 11, wherein the aforementioned additional disc unit comprising the stator component is removably attached to the other disc units comprising the stator component.

13. An arrangement according to claim 7, wherein channels assigned to the rotor component between the primary cavities and the second cavities occupy different planes.

14. An arrangement according to claim 6, wherein the valve arrangement is a two way valve arrangement.

15. An arrangement according to claim 1, wherein the guide rail or guide curve is helically-shaped.

\* \* \* \* \*